United States Patent
Wan

(10) Patent No.: US 9,931,803 B2
(45) Date of Patent: Apr. 3, 2018

(54) METHOD OF MANUFACTURING SOLE ASSEMBLY WITH CAMOUFLAGE APPEARANCE

(71) Applicant: NIKE, Inc., Beaverton, OR (US)

(72) Inventor: Tee L. Wan, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 366 days.

(21) Appl. No.: 14/645,864

(22) Filed: Mar. 12, 2015

(65) Prior Publication Data
US 2016/0263851 A1    Sep. 15, 2016

(51) Int. Cl.
| B29D 35/00 | (2010.01) |
| B29C 45/16 | (2006.01) |
| A43B 1/00  | (2006.01) |
| B29D 35/14 | (2010.01) |

(52) U.S. Cl.
CPC ........ B29D 35/0009 (2013.01); A43B 1/0027 (2013.01); B29D 35/142 (2013.01); B29D 35/148 (2013.01)

(58) Field of Classification Search
CPC ........................... B29D 35/142; B29D 35/148; B29D 35/0009; B29D 35/14; B29C 44/12; B29C 44/1228; B29C 44/1233; B29C 44/04; B29C 44/0492; A43B 1/0027
USPC ............................ 264/45.1, 45.4, 328.5, 37.3
See application file for complete search history.

(56) References Cited

U.S. PATENT DOCUMENTS

| 3,791,050 | A | * | 2/1974 | Egtvedt | ............ | A43B 13/12 36/28 |
| 4,642,911 | A | * | 2/1987 | Talarico, II | ............ | A43B 13/12 36/142 |
| 5,068,983 | A | * | 12/1991 | Marc | ............ | A43B 7/142 36/43 |
| 5,141,578 | A | * | 8/1992 | Yang | ............ | B29B 13/023 156/245 |
| 5,234,638 | A | * | 8/1993 | Jang | ............ | B29C 44/08 264/45.4 |
| 5,667,737 | A | * | 9/1997 | Wittmann | ............ | A43B 1/0027 264/245 |
| 5,972,257 | A | * | 10/1999 | Liu | ............ | B29C 44/027 264/161 |
| D451,662 | S | * | 12/2001 | Lucarelli | ............ | D2/947 |

(Continued)

FOREIGN PATENT DOCUMENTS

| CN | 1109720 A | 10/1995 |
| KR | 10-0328508 B1 | 2/2002 |

OTHER PUBLICATIONS

International Search Report and Written Opinion issued in corresponding PCT Application No. PCT/US2016/021733, dated Jun. 8, 2016.

Primary Examiner — Yogendra N Gupta
Assistant Examiner — Emmanuel S Luk
(74) Attorney, Agent, or Firm — Banner & Witcoff, Ltd.

(57) ABSTRACT

A method of manufacturing a sole assembly includes using a jig with a first mold assembly to distribute pellets a first material into a recess of a first mold member of the first mold assembly. A second material is injected into the first mold assembly, and the first mold assembly is heated to form a first preform. The first preform and a second preform are heated in a second mold assembly to form a sole assembly with a camouflage appearance around only a periphery of the sole assembly.

20 Claims, 8 Drawing Sheets

(56) References Cited

U.S. PATENT DOCUMENTS

| | | | |
|---|---|---|---|
| 6,884,376 B2* | 4/2005 | Chen | B29C 44/0492 222/478 |
| 7,313,876 B2 | 1/2008 | Morgan et al. | |
| 7,458,173 B2* | 12/2008 | Kielt | A43B 3/0063 36/145 |
| 7,832,116 B2 | 11/2010 | Lambert et al. | |
| 8,246,881 B2 | 8/2012 | Maranan et al. | |
| D690,490 S * | 10/2013 | Riddell | D2/951 |
| 9,049,901 B2* | 6/2015 | Dean | A43B 13/04 |
| D740,005 S * | 10/2015 | Silverman | D2/950 |
| 9,259,051 B2* | 2/2016 | Liebeno | A43B 13/16 |
| 9,498,927 B2* | 11/2016 | Watkins | B29D 35/122 |
| 9,610,746 B2* | 4/2017 | Wardlaw | B29D 35/0063 |
| 2004/0041292 A1* | 3/2004 | Chen | A43B 1/0027 264/45.4 |
| 2004/0261297 A1* | 12/2004 | Park | B29D 35/0054 36/87 |
| 2006/0061000 A1* | 3/2006 | Chun | A43B 13/04 264/45.4 |
| 2008/0005856 A1 | 1/2008 | Hung | |
| 2008/0073806 A1 | 3/2008 | Wang | |
| 2010/0043252 A1* | 2/2010 | Losio | A43B 7/141 36/44 |
| 2011/0047721 A1* | 3/2011 | Sills | B29D 35/0009 12/146 B |
| 2011/0099845 A1* | 5/2011 | Miller | A43B 7/142 36/91 |
| 2011/0283560 A1 | 11/2011 | Portzline et al. | |
| 2013/0126075 A1* | 5/2013 | Jiang | B29C 65/02 156/219 |
| 2013/0199059 A1* | 8/2013 | Wan | A43B 13/14 36/25 R |
| 2013/0291409 A1 | 11/2013 | Reinhardt et al. | |
| 2014/0223673 A1* | 8/2014 | Wardlaw | B29D 35/0063 12/146 B |
| 2014/0261996 A1* | 9/2014 | Faggin | B29D 35/142 156/245 |
| 2014/0290097 A1* | 10/2014 | Bann | A43B 13/127 36/102 |
| 2016/0129654 A1* | 5/2016 | Lee | B29D 35/142 264/46.5 |

* cited by examiner

METHOD OF MANUFACTURING SOLE ASSEMBLY WITH CAMOUFLAGE APPEARANCE

FIELD

Aspects of this invention relate generally to a sole assembly for an article of footwear, and, in particular, to a sole assembly formed from two preforms and having a camouflage appearance about its periphery.

BACKGROUND

Conventional articles of athletic footwear include two primary elements, an upper and a sole assembly. The upper provides a covering for the foot that comfortably receives and securely positions the foot with respect to the sole assembly. In addition, the upper may have a configuration that protects the foot and provides ventilation, thereby cooling the foot and removing perspiration. The sole assembly is secured to a lower portion of the upper and is generally positioned between the foot and the ground. In addition to attenuating ground reaction forces, the sole assembly may provide traction, control foot motions (e.g., by resisting over pronation), and impart stability, for example. Accordingly, the upper and the sole assembly operate cooperatively to provide a comfortable structure that is suited for a wide variety of activities, such as walking and running. An insole may be located within the upper and adjacent to a plantar (i.e., lower) surface of the foot to enhance footwear comfort, and is typically a thin, compressible member.

The sole assembly may incorporate multiple layers. Some footwear includes only a midsole, while others may also include an outsole secured to a bottom surface of the midsole. The midsole, which is conventionally secured to the upper along the length of the upper, is primarily responsible for attenuating ground reaction forces. The midsole may also form the ground-contacting element of footwear. In such embodiments, the midsole may include texturing, such as projections and recesses or grooves, in order to improve traction. The outsole, when present, forms the ground-contacting element and may be fashioned from a durable, wear-resistant material.

The midsole may be primarily formed from a resilient, polymer foam material, such as ethyl vinyl acetate (EVA), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

Figure 1:
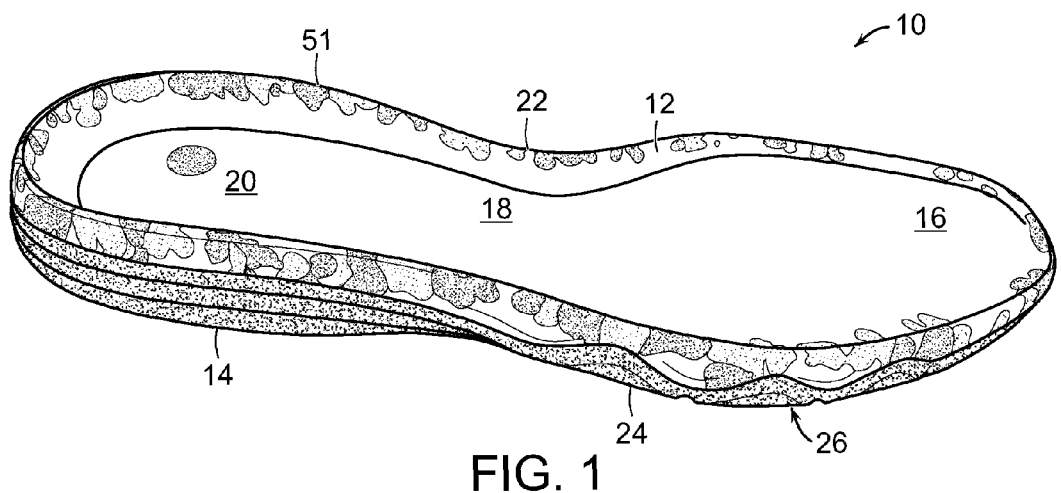
FIG. 1 is a perspective view of a sole assembly having a camouflage appearance about a periphery of an upper portion thereof.

The figures referred to above are not drawn necessarily to scale, should be understood to provide a representation of particular embodiments of the invention, and are merely conceptual in nature and illustrative of the principles involved. Some features of the mold assembly used to form a sole assembly formed of different preforms and related methods of manufacture depicted in the drawings have been enlarged or distorted relative to others to facilitate explanation and understanding. The same reference numbers are used in the drawings for similar or identical components and features shown in various alternative embodiments. Mold assemblies used for forming midsoles as disclosed herein would have configurations and components determined, in part, by the intended application and environment in which they are used.

DETAILED DESCRIPTION OF CERTAIN EXEMPLARY EMBODIMENTS

The principles of the invention may be used to advantage to provide a sole assembly formed of two preforms and having a camouflage appearance about a portion of its periphery. It would be desirable to provide a sole assembly formed from two preforms and a method and mold for manufacturing such a sole assembly with a camouflage appearance that reduces or overcomes some or all of the difficulties inherent in prior known devices.

In accordance with a first aspect, a method of manufacturing a sole assembly for an article of footwear includes positioning a jig above a first recess formed in a first mold member of a first mold assembly and depositing a plurality of pellets of a first material from the jig into the first recess. The jig is configured to distribute the plurality of pellets about only a periphery of the first recess. The first mold assembly is closed by positioning a second mold member in contact with the first mold member, with the first recess and the second mold member cooperating to define a preform recess. A second material having a color different than a color of the pellets is injected into the preform recess. The first and second materials are subjected to heat to partially cure and partially bond together the first and second materials so as to form a first preform. The first preform is placed adjacent a second preform in a second mold assembly. The first and second preforms in the second mold assembly are subjected to heat for a predetermined period of time at a predetermined temperature such that the first and second preforms expand and fully bond together to form a sole assembly having a camouflage appearance about only a periphery of a portion of the sole assembly corresponding to the first preform.

In accordance with another aspect, the first preform is formed with pellets of multiple colors, and the pellets may have a color different than that of the color of the second material.

In accordance with a further aspect, the first preform may include first engaging members, and the second preform may include second engaging members that mate with the first engaging members to restrict movement of the first and second preforms with respect to one another.

By providing a sole assembly formed from first and second preforms with a camouflage appearance about a portion of its periphery and a method and mold for manufacturing such a sole assembly, footwear with improved aesthetic appeal can be produced. These and additional features and advantages will be apparent to those skilled in the art, that is, those who are knowledgeable or experienced in this field of technology, in view of the following disclosure of the invention and detailed description of certain exemplary embodiments.

Figure 2:
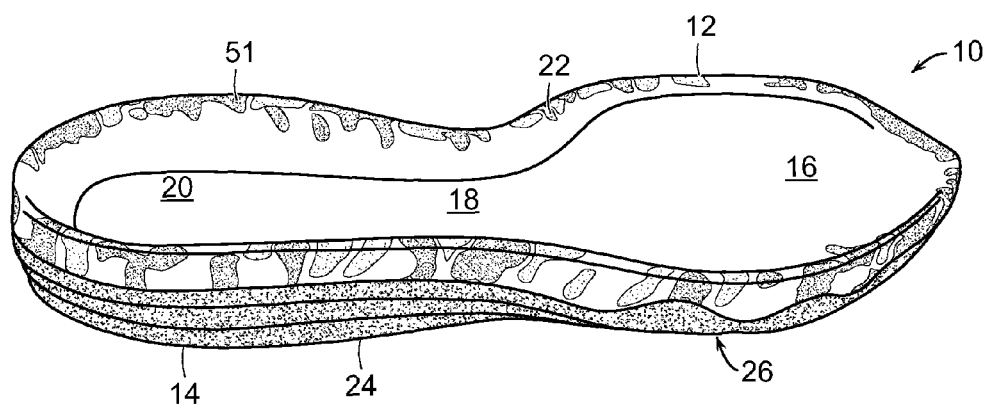
FIG. 2 is a perspective view of an alternative embodiment of the sole assembly of FIG. 1.
Figure 3:
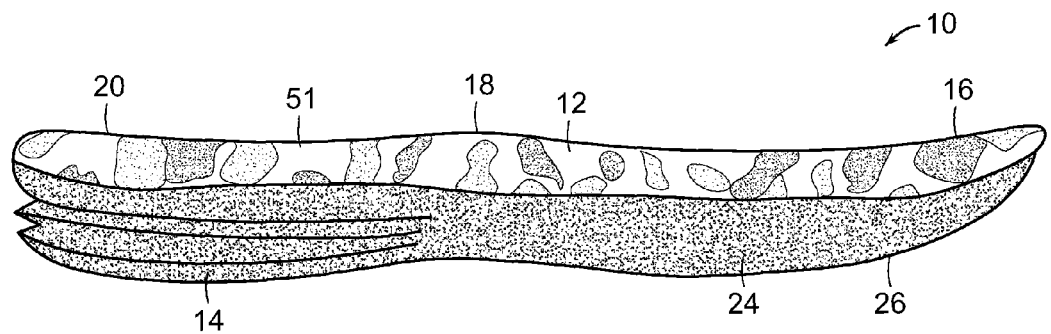
FIG. 3 is an elevation view of another alternative embodiment of the sole assembly of FIG. 1.

A sole assembly 10 for an article of footwear is depicted in FIGS. 1-3. It is to be appreciated that in certain embodiments, sole assembly 10 may serve as a midsole, with an outsole (not shown) being secured to the bottom surface of the midsole. In other embodiments, the bottom surface of sole assembly 10 as seen here serves as the ground-engaging portion (or other contact surface-engaging portion) of the article of footwear.

Sole assembly 10 includes a first portion 12 and a second portion 14 positioned beneath first portion 12. First portion 12 has a plurality of colors, with the plurality of colors forming a camouflage appearance about only a periphery of first portion 12. In certain embodiments, the camouflage appearance is provided about an entire periphery of first portion 12. It is to be appreciated that first portion 12 may be formed of two or more colors. Second portion 14 may be formed with a single color. The color of second portion 14 may be different than all of the colors of first portion 12, or it may be the same as one of the colors of first portion 12.

In certain embodiments, as seen in FIG. 3, the camouflage appearance of sole assembly 10, which is found only in first portion 12, is visibly disposed at approximately 50% or less of the entire peripheral edge of sole assembly 10. As seen in the embodiment illustrated in FIG. 3, the camouflage appearance is visibly disposed at only an upper portion of the peripheral edge of sole assembly 10.

In certain embodiments, the materials used to form first portion 12 and second portion 14 may also have different physical properties and, therefore, different performance characteristics. For example, the hardness of the various portions may be different. It is to be appreciated that any of the known physical properties or performance characteristics for sole assemblies can be different for the different portions of sole assembly 10, thereby altering the support, cushioning, load carrying capability, wear characteristics, and tread life of sole assembly 10, for example. For example, first and second portions 12, 14 may have different hardnesses, densities, specific gravities, or any other desired physical property. Other suitable physical properties or performance characteristics for which the first and second portions may have different values will become readily apparent to those skilled in the art, given the benefit of this disclosure.

Sole assembly 10 serves to provide shock-attenuation and energy-absorption for an article of footwear. Sole assembly 10 can be used for any of various articles of casual footwear having configurations suitable, for example, for walking or lounging. Sole assembly 10 may also be included as part of a wide range of athletic footwear styles, including shoes that are suitable for soccer, running, basketball, baseball, cross-training, football, rugby, tennis, and volleyball, for example. An individual skilled in the relevant art will appreciate, therefore, that the concepts disclosed herein with regard to sole assembly 10 may be applied to a wide variety of footwear styles, in addition to the specific styles discussed herein and depicted in the accompanying figures.

For purposes of reference in the following description, sole assembly 10 may be divided into three general regions: a forefoot region 16, a midfoot region 18, and a heel region 20. Regions 16-20 are not intended to demarcate precise areas of sole assembly 10. Rather, regions 16-20 are intended to represent general areas of sole assembly 10 that provide a frame of reference during the following discussion. Although regions 16-20 apply generally to sole assembly 10, references to regions 16-20 also may apply specifically to first portion 12, second portion 14, or individual components or portions of sole assembly 10.

For purposes of reference, sole assembly 10 includes a medial side 22 and an opposite lateral side 24. Lateral side 24 is positioned to extend along a lateral side of the foot (i.e., the outside) and generally passes through each of regions 16-20. Similarly, medial side 22 is positioned to extend along an opposite medial side of the foot (i.e., the inside) and generally passes through each of regions 16-20.

As noted above, a separate outsole member may be secured to a bottom surface 26 of sole assembly 10, and serve as the ground-engaging surface of the footwear. In other embodiments, bottom surface 26 itself may serve as the ground-engaging surface of the footwear.

In known fashion, an upper may be secured to the upper surface of sole assembly 10 in order to fully form the footwear. The upper may be secured to sole assembly 10 with an adhesive, or in any other known fashion. The upper is not shown here as those skilled in the art are well aware of how an upper is secured to a midsole, and, therefore, such a drawing is not necessary for an understanding of the invention.

The materials used to form first portion 12 and second portion 14 of sole assembly 10 may be injection phylon (ethylene vinyl acetate or "EVA"). The EVA may have a vinyl acetate (VA) level between approximately 9% and approximately 40%. Suitable EVA resins include Elvax®, provided by DuPont, and Engage, provided by the Dow Chemical Company, for example. In certain embodiments, the EVA may be formed of a combination of high melt index and low melt index material. For example, the EVA may have a melt index between approximately 1 and approximately 50.

The EVA may also include various components including a blowing agent. The blowing agent may have a percent weight between approximately 10% and approximately 20%. Suitable blowing agents include azodicarboamide, for example. In certain embodiments, a peroxide-based curing agent, such as dicumyl peroxide may be used. The amount of curing agent may be between approximately 0.6% and approximately 1.5%. The EVA may also include homogenizing agents, process aids, and waxes. For example, a mixture of light aliphatic hydrocarbons such as Struktol® 60NS may be included. The EVA may also include other constituents such as a release agent (e.g., stearic acid), activators (e.g., zinc oxide), fillers (e.g., magnesium carbonate), pigments, and clays.

Other suitable materials for first portion 12 and second portion 14 will become readily apparent to those skilled in the art, given the benefit of this disclosure.

Figure 4:
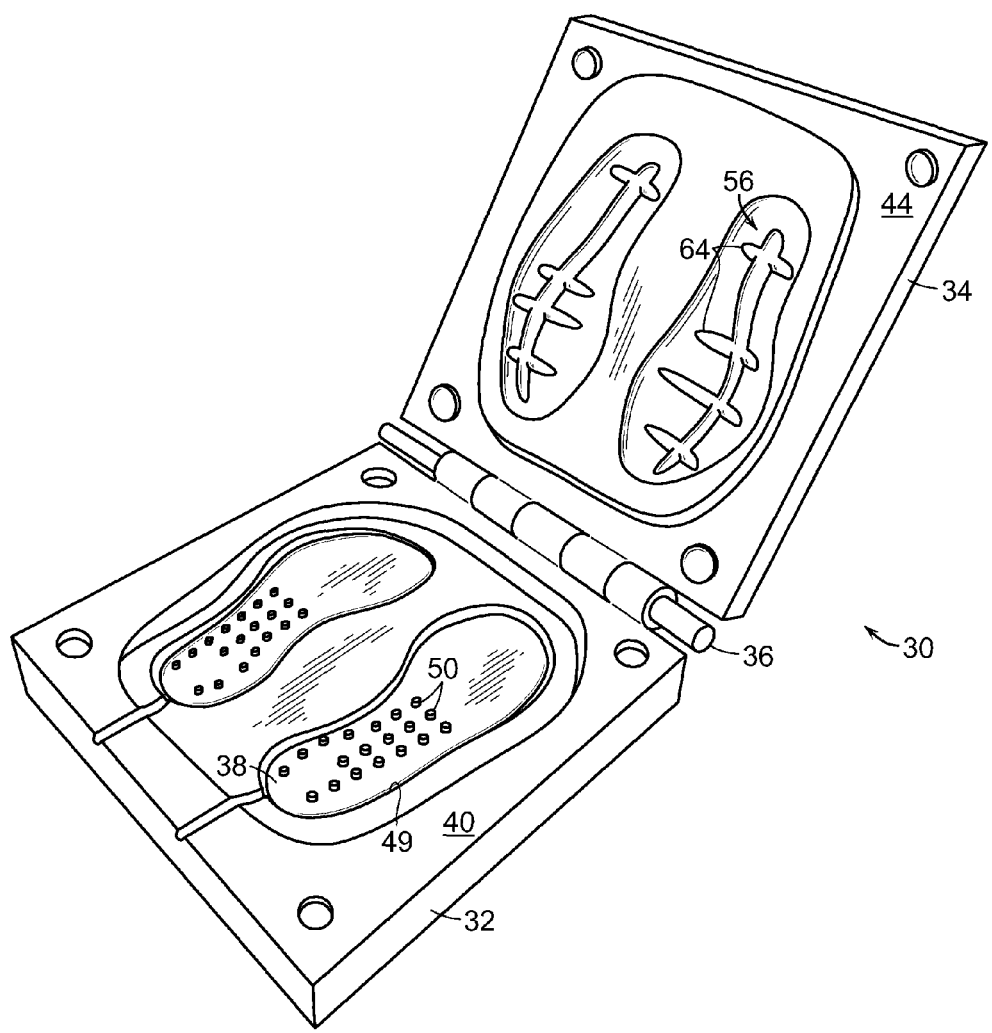
FIG. 4 is a perspective view of a first mold assembly used to form a first preform of the sole assembly of FIG. 1.

A first mold assembly 30 used to form a first preform of sole assembly 10 is illustrated in FIG. 4, and includes a first mold member 32 and a second mold member 34. First mold member 32 is connected to second mold member 34 by way of a hinge member 36. As illustrated here, first mold assembly 30 is used during the formation of a mating pair of first preforms for a pair of sole assemblies 10. However, for ease of explanation, the following description is directed to forming a single first preform for a single sole assembly 10. It is also to be appreciated that more than two sole assemblies could be simultaneously produced with first mold assembly 30 and the additional mold assembly elements and steps shown and described herein.

A first recess 38 is formed in a surface 40 of first mold member 32, and a second recess 42 is formed in a surface 44 of second mold member 34. First recess 38 and second recess 42 cooperate to define a preform recess 46, seen in FIG. 7, used to form a first preform 48, seen in FIG. 8. First preform 48 will become first portion 12 of sole assembly 10 after being bonded to a second preform as described below. In the illustrated embodiment, first preform 48 is formed in an inverted fashion in first mold assembly 30 such that first mold member 32 serves to define a top surface of first preform 48 and second mold member 34 forms a bottom surface of first preform 48.

A groove 49 may be formed in first mold member 32, and extends about an entire periphery of first recess 38. Groove 49 serves form a corresponding rim or rib 51 about a periphery of first preform 48, as seen in FIG. 8.

Figure 8:
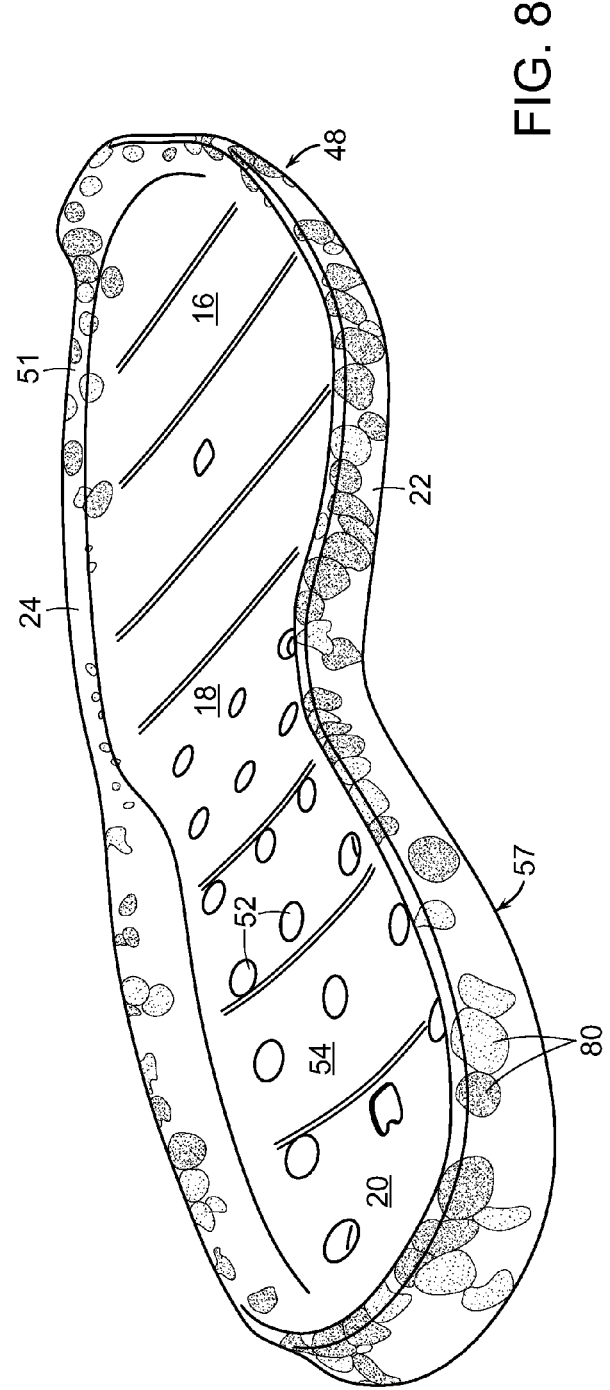
FIG. 8 is a perspective view of the first preform formed in the first mold assembly of FIG. 4.

As seen in the illustrated embodiment, one or more surface irregularities 50 may be formed on the surface of first recess 38 of first mold member 32, and serve to form mirror image surface irregularities 52 in the top surface 54 of first preform 48, as seen in FIG. 8. As seen here, surface irregularities 50 may be projections extending outwardly from the surface of first recess 38 such that surface irregularities 52 in top surface 54 are depressions or recesses. It is to be appreciated that surface irregularities 50 can take any form, such as the projections illustrated here, or they may be depressions or recesses (which would naturally form mating projections in top surface 54), or any combination of projections and recesses.

Figure 9:
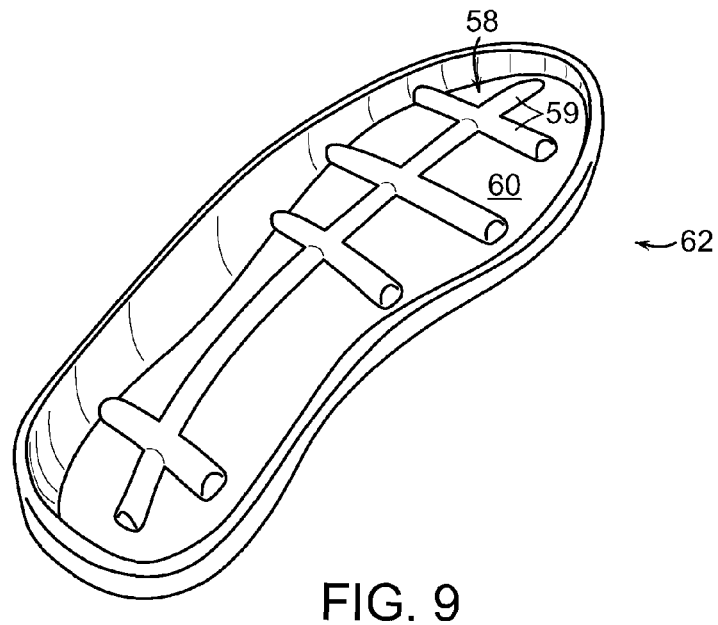
FIG. 9 is a perspective view of a second preform used to form the sole assembly of FIG. 1.
Figure 10:
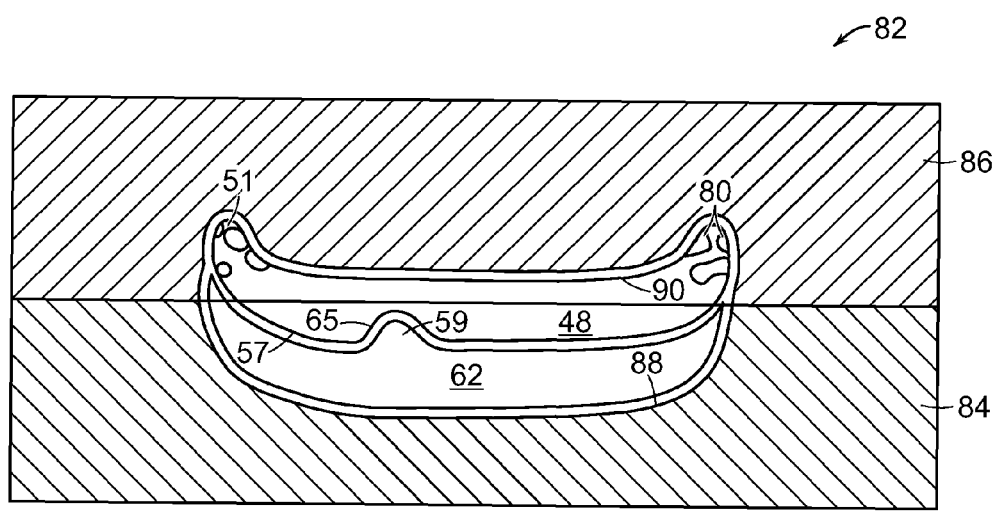
FIG. 10 is a partial section view of a second mold assembly used to form the sole assembly of FIG. 1, shown in a closed condition with the first and second preforms positioned therein.

In the illustrated embodiment, one or more surface irregularities 56 may also be formed on the surface of second recess 42 of second mold member 34. Surface irregularities 56 serve to form mirror image surface irregularities 65 on the bottom surface 57 of first preform 48, as seen in FIG. 10. Surface irregularities 65 on bottom surface 57 of first preform 48 may act as first engaging members, while surface irregularities 58 formed on a top surface 60 of a second preform 62, seen in FIG. 9, act as second engaging members. The first and second engaging members mate with one another to restrict movement of first preform 48 with respect to second preform 62.

In the embodiment illustrated here, surface irregularity 56 may include a plurality of connected ribs 64 that naturally form a plurality of surface irregularities 65 such as connected grooves 65, seen in FIG. 10, in the bottom surface of first preform 48. Grooves 65 may mate with corresponding surface irregularities 58 such as ribs 59 formed in top surface 60 of second preform 62 when first preform 48 and second preform 62 are positioned together. The mating of surface irregularities 65 in the bottom surface of first preform 48 and surface irregularities 58 in top surface of second preform 62 promote a mating engagement and interlocking of first preform 48 and second preform 62 when they are positioned in second mold assembly 82, described below.

It is to be appreciated that that the surface irregularities 56 of second mold member 34 of first mold assembly 30 used to form surface irregularities 65 in first preform 48 and surface irregularities 58 formed in second preform 62 can take any form, such as projections, or depressions/recesses/ or grooves, or any combination thereof.

A release agent may be applied to the exposed surfaces of first mold member 32 and second mold member 34 of first mold assembly 30 in order to facilitate the separation of first preform 48 from first mold assembly 30 after its formation. The release agent may be a spray release agent or any other suitable release agent. Suitable materials for the release agent include, for example, siloxane and water. Other suitable release agents will become readily apparent to those skilled in the art, given the benefit of this disclosure.

Figure 5:
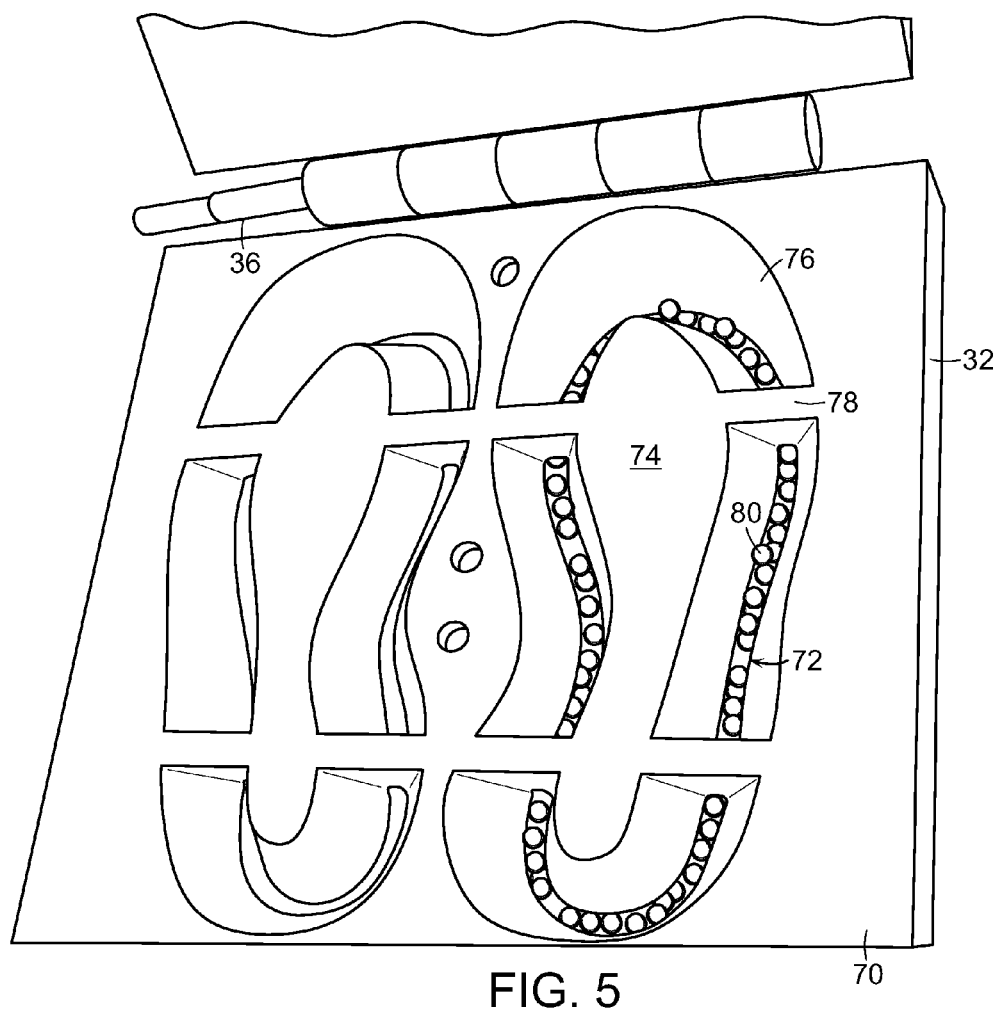
FIG. 5 is a perspective view of a first mold member of the first mold assembly of FIG. 4, shown with a jig positioned on top of the first mold member.

To form first preform 48, a jig 70 as seen in FIG. 5 is positioned above first recess 38 of first mold member 32 of first mold assembly 30. Jig 70 includes an aperture such as groove 72 that is open at its bottom end such that groove 72 extends completely through jig 70. Groove 72 is positioned above groove 49 of first mold member 32. Groove 72 may be formed by positioning an island 74 within a through aperture 76 formed in jig 70, with island 74 connected to jig 70 by way of a plurality of bridges 78 that serve to fix island 74 with respect to jig 70.

Figure 6:
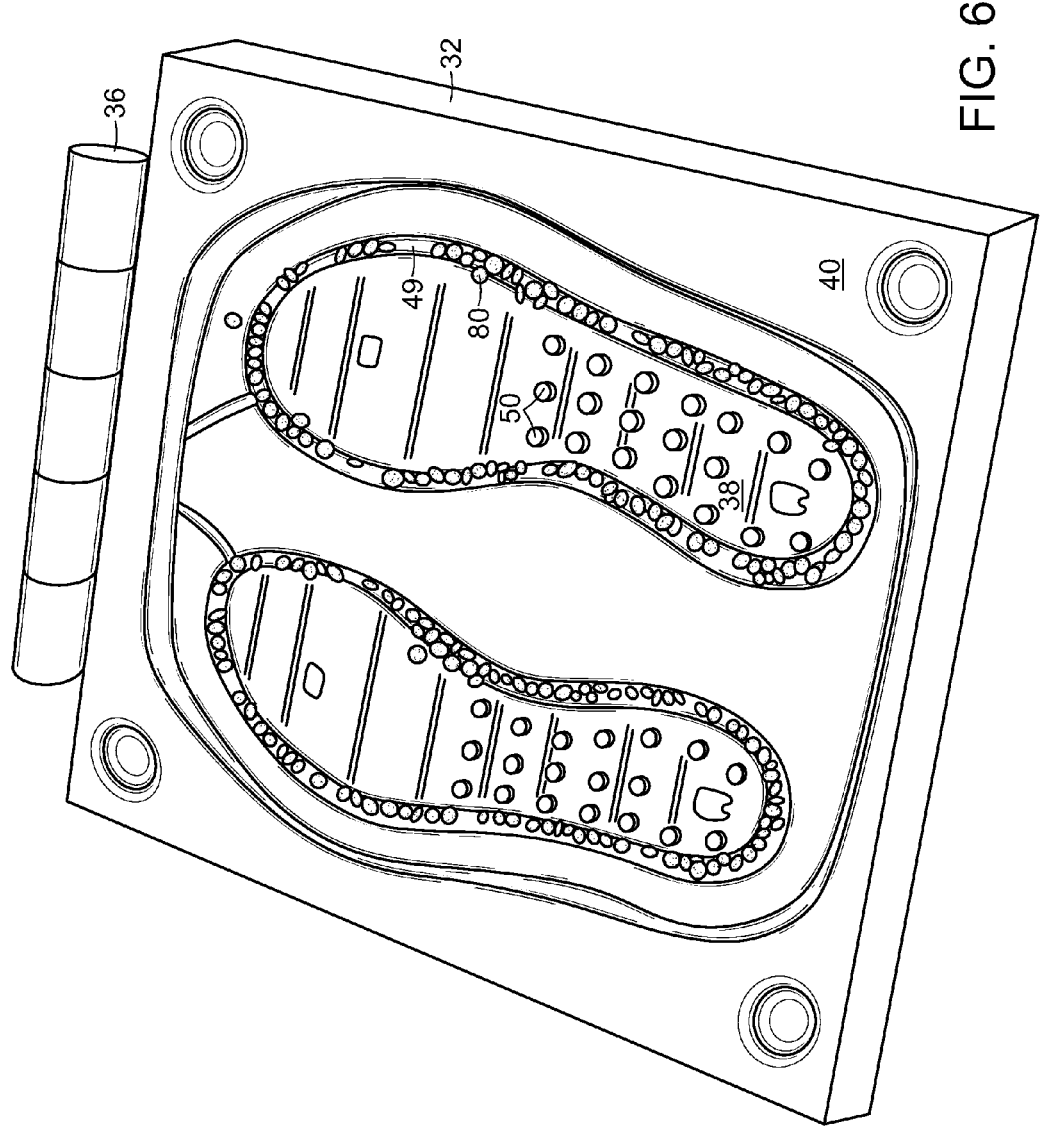
FIG. 6 is a perspective view of the first mold member of FIG. 5, shown with pellets of a first material deposited in a first recess of the first mold member.

A plurality of pellets 80 formed of a first material are deposited in groove 72, and naturally are received in groove 49 of first recess 38. Pellets 80 may have a single color or they may be formed of a plurality of colors. As seen in FIG. 6, when jig 70 is removed, pellets 80 are positioned within first recess 38. The use of jig 70 and its groove 72 as well as groove 49 of first recess 38 serves to deposit pellets 80 only about the periphery of first recess 38.

Figure 7:
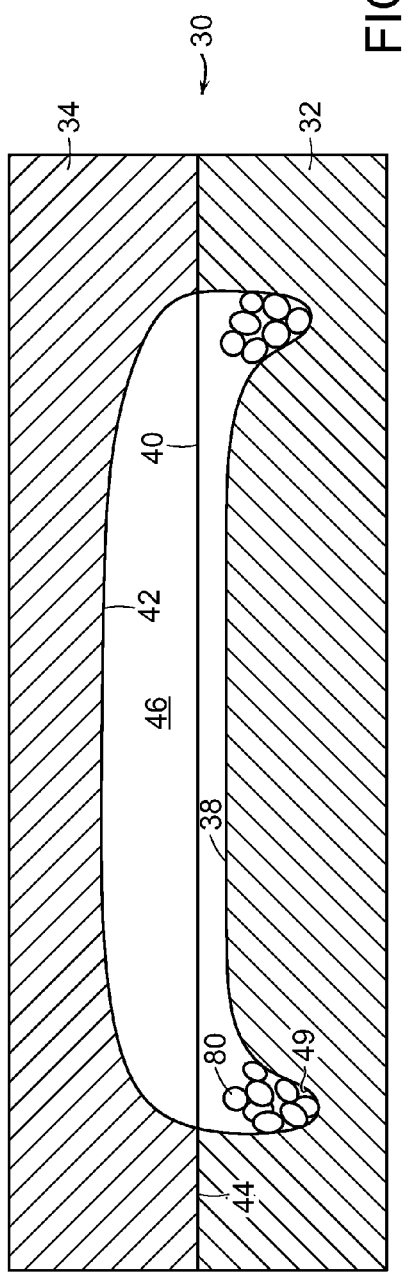
FIG. 7 is a section view of the first mold assembly of FIG. 4, shown in a closed condition with pellets of the first material deposited in the first recess of the first mold member.

First mold assembly 30 is then closed, as seen in FIG. 7, such that second mold member 34 is in contact with first mold member 32, and first recess 38 and second recess 42 cooperate to define preform recess 46. A second material is then injected into preform recess 46 in known fashion. The second material may have a single color that is different than a color of at least one of the pellets 80. In certain embodiments, the color of the second material is different than a color of all of the pellets 80.

Heat is then applied to first mold assembly 30 such that the first and second materials within preform recess 46 partially cure and partially bond together so as to form first preform 48. As seen in FIG. 8, when first preform 48 is removed from first mold assembly 30, pellets 80 may not be fully melted and/or fully incorporated into the second material such that clear borders and edges of pellets 80 are visible to the naked eye.

In certain embodiments, first mold assembly 30 is maintained at a temperature between approximately 155° C. and approximately 175° C. for a time interval between approximately 30 seconds and approximately 1.5 minutes.

Pellets 80 combine with the second material to provide a camouflage appearance on first preform 48. Depositing pellets 80 in groove 49 allows the camouflage appearance to be restricted to only the periphery of first preform 48. Thus, the camouflage appearance extends into the surface of first preform a first depth, but does not extend throughout the entire width of first preform 48.

As seen in FIG. 10, a second mold assembly 82 includes a first mold member 84 and a second mold member 86. A first recess 88 formed in a surface of first mold member 84 and a second recess 90 formed in a surface of second mold member 86 combine to form a sole assembly recess 92. First preform 48 is positioned on and in contact with second preform 62 within sole assembly recess 92 in second mold assembly 82. Second preform 62 will become second portion 14 of sole assembly 10 after being bonded to first preform 48 in second mold assembly 82. In the illustrated embodiment, first preform 48 overlies and is substantially coextensive with second preform 62 and, naturally, first portion 12 overlies and is substantially coextensive with second portion 14 of sole assembly 10.

As noted above, first engaging members such as surface irregularities 65 on bottom surface 57 of first preform 48 and second engaging members, such as surface irregularities 58 formed on top surface 60 of a second preform 62, mate and interlock with one another to restrict movement of first preform 48 with respect to second preform 62 within sole assembly recess 92.

Second mold assembly 82 is closed so that first mold member 84 is in contact with second mold member 86, with first and second preforms 48, 62 seated within sole assembly recess 92 in mating engagement. First mold member 84 and second mold member 86 may be hinged together, or they may be separate elements that are suitably aligned and placed in contact with one another.

Heat is supplied to second mold assembly 82 with first preform 48 and second preform 62 contained therein for a predetermined period of time. In certain embodiments, second mold assembly 82 is heated at a temperature of between approximately 170° C. and 180° C. for approximately 10 minutes, thereby causing first and second preforms 56, 58 to partially melt and completely bond together to form sole assembly 10. The specific temperature and time period used to form sole assembly 10 in second mold assembly 82 can be varied, in known fashion, depending on the particular EVA used.

After this heating step is complete, second mold assembly 82 is opened, and sole assembly 10, formed of first preform 48 and second preform 62, expands in known fashion after it is removed from second mold assembly 82. Sole assembly 10 then goes through typical stabilization steps, including cooling and trimming, as necessary.

It is to be appreciated that in certain embodiments, second mold assembly 82 is preheated such that it is at the desired heating temperature when first and second preforms 48, 62 are positioned within sole assembly recess 92.

As noted above, providing different physical properties for first and second preforms 48, 62 and allows sole assembly 10 to be customized or optimized to provide particular aesthetic and/or performance characteristics.

A release agent may be applied to the exposed surface of first and second preforms 48, 62 and/or the surfaces of first recess 88 of first mold member 84 and second recess 90 of second mold member 86 in order to facilitate the separation of sole assembly 10 from second mold assembly 82 after its formation. The release agent may be a spray release agent or any other suitable release agent. Suitable materials for the release agent include, for example, siloxane and water. Other suitable release agents will become readily apparent to those skilled in the art, given the benefit of this disclosure.

Figure 11:
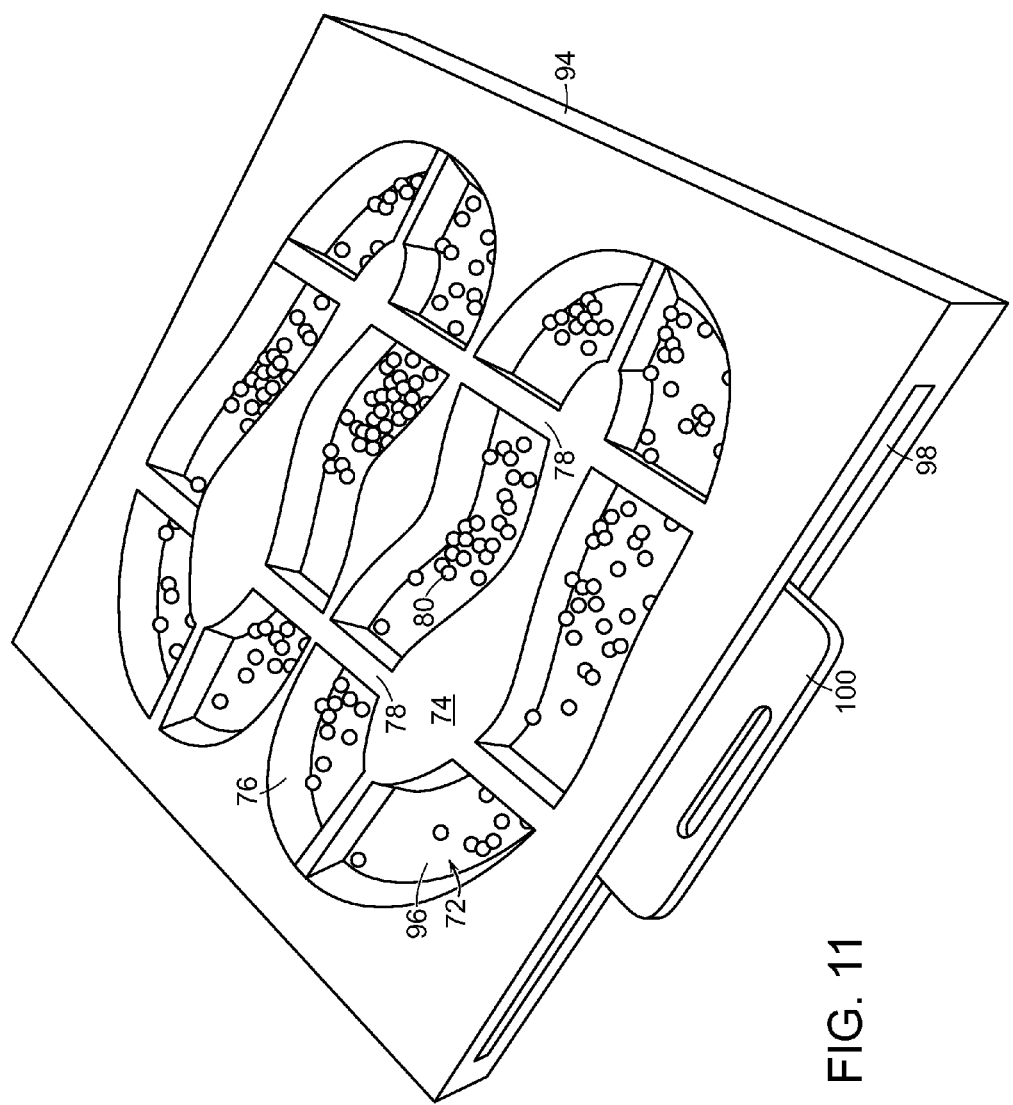
FIG. 11 is a perspective view of an alternative embodiment of a jig used to deposit pellets of the first material into the first recess of the first mold member.

An alternative embodiment of a jig 94 used to deliver pellets 80 to first mold assembly 30 is seen in FIG. 11. Jig 94 may include a removable insert 96 that is received in an aperture or recess 98 formed in jig 94. Recess 98 is formed in a side of jig 94, and may, in certain embodiments, extend completely through jig 94 through the opposite side of jig 94. Jig 94 may include a handle 100 to facilitate insertion of insert 96 into recess 98 and removal of insert 96 from recess 98.

In use, insert 96 is positioned within recess 98 of jig 94, and pellets 80 are then deposited within groove 72. Insert 96 prevents pellets 80 from passing through groove 72 so that jig 94 may then be transported to first mold assembly 30. The use of insert 96 in jig 94 means that jig 94 need not be positioned on first mold member 32 of first mold assembly 30 when pellets are deposited in groove 72.

Once jig is positioned on first mold member 32 of first mold assembly 30, removable insert 96 can then be removed from jig 94 such that pellets 80 fall through groove 72 into first recess 38 of first mold member 32. First preform 48 is then formed in first mold assembly 30 as described above.

Figure 12:
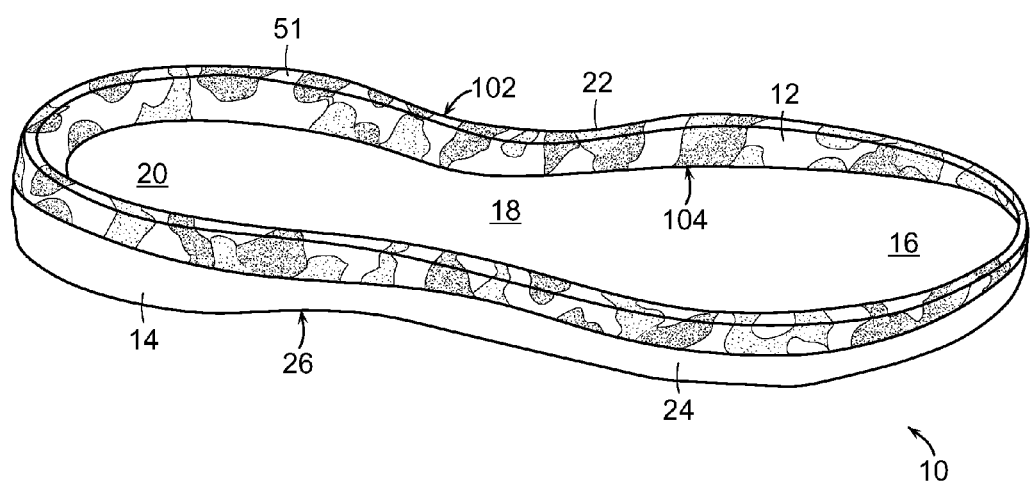
FIG. 12 is a perspective view of an alternative embodiment of the sole assembly of FIG. 1.

An alternative embodiment of a sole assembly 10 is seen in FIG. 12. In this embodiment, first portion 12, which is formed from first preform 48 as described above, is configured substantially as an enclosed ring 102 that corresponds in shape to, and overlies only, a peripheral portion of second portion 14, which is formed from second preform 62. In such an embodiment, the enclosed ring 102 forming first portion 12 surrounds a central opening 104 of first portion 12.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing a sole assembly for an article of footwear comprising
positioning a jig above a first recess formed in a first mold member of a first mold assembly;
depositing a plurality of pellets of a first material from the jig into the first recess, the jig configured to distribute the plurality of pellets about an entirety of a periphery, and only the periphery, of the first recess;
closing the first mold assembly by positioning a second mold member in contact with the first mold member, the first recess and the second mold member cooperating to define a preform recess;
injecting into the preform recess a second material having a color different than a color of at least a portion of the plurality of the pellets;
heating the first and second materials sufficiently to partially cure and partially bond together the first and second materials so as to form a first preform;
placing the first preform adjacent a second preform in a second mold assembly;
heating the first and second preforms in the second mold assembly for a predetermined period of time at a predetermined temperature such that the first and second preforms expand and fully bond together to form a sole assembly having a camouflage appearance about only a periphery of a portion of the sole assembly corresponding to the first preform; and removing the sole assembly from the second mold assembly.

2. The method of claim 1, wherein the plurality of pellets includes pellets of two or more colors.

3. The method of claim 1, wherein a color of the second material is different from the colors of any of the plurality of pellets.

4. The method of claim 1, wherein a color of the second preform is different than a color of the second material.

5. The method of claim 1, wherein a color of the second preform is darker than a color of the second material.

6. The method of claim 1, wherein a color of the second preform is different from a color of the second material and different from a color of any of the pellets.

7. The method of claim 1, wherein a physical property of the first preform is different from a physical property of the second preform.

8. The method of claim 1, wherein a groove is formed about the periphery of a bottom of the first recess, the pellets being received in the groove.

9. The method of claim 1, wherein the second mold assembly is heated when the first and second preforms are placed in the second mold assembly, and the second mold assembly is then continued to be heated at the predetermined temperature for the predetermined period of time.

10. The method of claim 1, wherein a surface of the first preform has a plurality of first engaging members and a surface of the second preform has a plurality of second engaging members, the first and second engaging members configured to mate with one another to restrict movement of the first preform with respect to the second preform.

11. The method of claim 10, wherein each of the first engaging members is either of a projection or a recess, and a second engaging member corresponding to each of the first engaging members is the other of either of a projection or a recess.

12. The method of claim 1, wherein the jig includes an aperture extending completely through the jig and a removable insert, the removable insert configured to be positioned within the jig so as to close off the aperture.

13. The method of claim 12, wherein the jig includes a plurality of additional apertures extending completely through the jig, the removable insert configured to be positioned within the jig so as to close off each of the apertures.

14. The method of claim 1, wherein the sole assembly is a midsole.

15. The method of claim 1, wherein the camouflage appearance is visibly disposed around an entire periphery of the sole assembly.

16. The method of claim 15, wherein the camouflage appearance is visibly disposed at only an upper portion of a peripheral edge of the sole assembly.

17. The method of claim 1, wherein at least one of the first material and the second material comprises ethylene vinyl acetate.

18. The method of claim 1, wherein the first preform is configured substantially as an enclosed ring corresponding in shape to, and overlying only, a peripheral portion of the second preform, wherein the enclosed ring surrounds a central opening of the first preform.

19. The method of claim 1, wherein the first preform overlies and is substantially coextensive with the second preform.

20. The method of claim 1, wherein the camouflage appearance extends to at least a first depth below an outer surface of the sole assembly.

* * * * *

UNITED STATES PATENT AND TRADEMARK OFFICE
CERTIFICATE OF CORRECTION

| | | |
|---|---|---|
| PATENT NO. | : 9,931,803 B2 | Page 1 of 1 |
| APPLICATION NO. | : 14/645864 | |
| DATED | : April 3, 2018 | |
| INVENTOR(S) | : Wan | |

It is certified that error appears in the above-identified patent and that said Letters Patent is hereby corrected as shown below:

In the Claims

Column 8, Claim 1, Line 46:
Delete "comprising" and insert --comprising:-- therefor Signed and Sealed this
Eighteenth Day of July, 2023

Katherine Kelly Vidal
*Director of the United States Patent and Trademark Office*